United States Patent [19]
Childers

[11] 3,868,183
[45] Feb. 25, 1975

[54] EXPOSURE CONTROL SYSTEM
[75] Inventor: Warren Childers, Houston, Tex.
[73] Assignee: Graphic Arts Manufacturing Co., Inc., Houston, Tex.
[22] Filed: July 16, 1973
[21] Appl. No.: 379,608

[52] U.S. Cl. .................. 355/68, 355/38, 355/83
[51] Int. Cl. ........................................ G03b 27/76
[58] Field of Search .................. 355/68, 69, 38, 83

[56] References Cited
UNITED STATES PATENTS
3,542,470  11/1970  Ost ........................................ 355/68

Primary Examiner—Richard A. Wintercorn

[57] ABSTRACT

It the exposure of photographic mediums, factors such as highlight density, shadow tone density, screen range, and excess optical density are of significance in controlling of the exposure. The apparatus of the present invention is a control system utilizing a bridge circuit to relate these four qualities and further includes improvements in the operation of the timing circuitry. The apparatus is responsive to selected inputs.

16 Claims, 3 Drawing Figures

EXPOSURE CONTROL SYSTEM

BACKGROUND OF THE INVENTION

In the exposure of photographic mediums such as color separations of a negative into the three primary colors and balck and white, many adjustments must be fed into the apparatus which controls the exposure to obtain the four separate images from the color separation. In a typical facility where a large process camera or camera-type device is used, the repetitive operation requires many sets of data to be input to the control device. Quite often, this is done in a dark room.

The apparatus of the present invention constitutes an improvement over applicant's previous U.S. Pat No. 3,545,858. While the apparatus of that patent has served quite well, the present invention constitutes an advance over that apparatus in the provision of means for dealing with the problems mentioned herein. The apparatus of the present invention constitutes a material improvement in the ability to handle an extended optical density range. The apparatus is able to handle an optical density range of two or three orders of magnitude greater than that of devices presently available.

SUMMARY OF THE INVENTION

In the preferred embodiment of the present invention, a bridge circuit responds to the highlight density, shadow tone density, screen range, and excess optical density to calculate these variables. In the ordinary circumstances, one of these variables is unknown. The apparatus incorporates a means whereby those which are known are supplied to the bridge circuit, and the unknown is obtained by manipulation of the instrument even in the dark. The operator is not required to engage in hand calculations.

The apparatus includes a pair of RC decay circuits. The RC decay circuits utilize adjustable resistors and capacitors to input the data required for an exposure. Two such RC timing circuits are used. A photocell responds to the light being monitored. As the light falls on the photocell, it controls the rate at which the RC circuit is discharged. When the RC circuit discharges to a predetermined level, as sensed by a thyratron, it forms a pulse for a digital circuit. Operation of both RC timing circuits constitutes one cycle which is then input and totalled in a digital counter. The number of operations on the digital counter is thus related to the optical density to be measured. Inputs can be provided manually or automatically.

DESCRIPTION OF THE PREFERRED EMBODIMENT

Figure 1A:
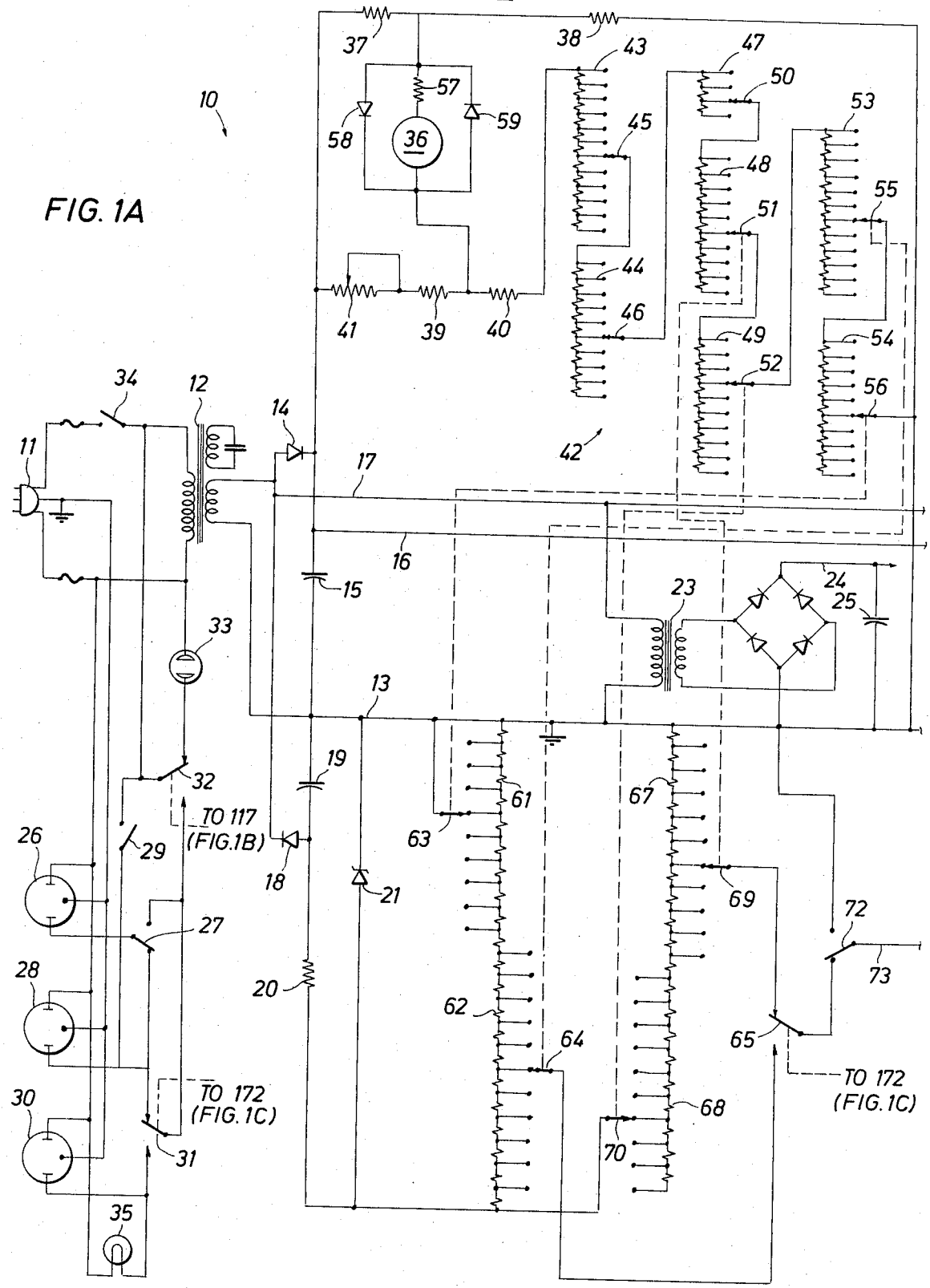
FIG. 1 is a single view found on three sheets which discloses the schematic of the preferred embodiment of the present invention.

The present invention is indicated by the numeral 10. It is shown in three views which interconnect with FIG. 1A on the left, and FIG. 1C on the right of FIG. 1B. Beginning a description of the circuitry, attention is directed to the left hand side of FIG. 1A. The description will generally proceed to the right. In FIG. 1A the numeral 11 indicates a power plug which is connected to the primary of a transformer 12. The transformer has a secondary which is grounded to a system ground conductor 13. One side of the secondary is connected to a diode 14 to a filter capacitor 15 connected to ground. This forms an elevated DC level on a conductor 16. The conductor 17 provides an AC input for various components, the AC being regulated by the transformer 12.

The numeral 18 identifies a diode providing a negative voltage supply. The output is grounded through a capacitor 19 to remove AC components. The negative supply is fed through a series dropping resistor 20 and then to a Zener diode 21 which regulates the negative supply for a group of resistors as will be described.

An additional supply incorporates a step down transformer connected to a four diode full wave rectification bridge forming a suitable DC level on a conductor 24. The output again is filtered by a capacitor to ground indicated by the numeral 25.

Continuing on with the description of FIG. 1A, the numeral 26 identifies a shutter control output terminal. The apparatus of the present invention is intended for cooperation with various makes of process cameras and to this end, it must be interconnected with a variety of voltage levels and the like. The socket 26 provides power to control the shutter in such a cooperative apparatus. A hand operated switch 27 turns the power off or on. The numeral 28 identifies a second socket which is adapted to be connected with lamps for the process camera. It is controlled by manipulation of a switch 29. The numeral 30 identifies an output power socket for the flash lamps. It is controlled by a set of relay contacts indicated at 31 which are controlled by a relay winding which will be described later on. Power is applied to the relay contacts 31 through another set of the relay contacts 32. Their winding will be described hereinafter.

A pilot light 33 indicates that the equipment has been turned on, but is not at the moment being operated. The numeral 34 identifies the control switch for the entire apparatus. Appropriate fuses are placed preferably in both the common and in the hot lead of the AC operated device. A lamp 35 is parallel to the flash lamp output 30.

Attention is next directed to the upper portions of FIG. 1A where a meter 36 is the indicating element of a bridge network. Two fixed legs are provided on the bridge and are the resistors 37 and 38. Two variable legs are incorporated which include series fixed resistors 39 and 40. A first adjustable resistive leg 41 is connected in series with the fixed resistor 39 which prevents shorting of the entire leg of the bridge in the event the resistor 41 is trimmed to zero. The resistor 40 is in series with a resistive network generally indicated at 42 and serves the same function as the resistor 39.

Before a full description of the operation of the bridge is stated, it is helpful to relate its operation to the optical values being adjusted. The symbol H represents the highlight density which is usually a number in the range of 0.00 to about 0.30. The shadow tone optical density is given by the symbol S and is a larger number and can for the present system, range as high as about 6.99. In practice it will be smaller. The symbol R represents the screen range. This is the range of optical density for the screen that is used in the photographic process. The symbol E represents the excess optical density range. A relationship can be derived wherein:

$$S = H + R + E$$

The bridge circuit of FIG. 1A is arranged to calculate these values. The potentiometer 41 represents the shadow tone optical density S. The leg 42 is comprised of three components in series. They represent the three additional values, or $H + R + E$. Considered individually, the series resistor 43 represents a tenth of a unit of screen range while the series resistor 44 represents hundredths of units of screen range. The numeral 45 identifies a movable tap which is positioned at a terminal representative of the screen range. The numeral 46 identifies a second movable tap which is adjustable to specified hundredths of the screen range. In the preferred embodiment, the device has a screen range adjustable from about 0.50 to about 1.69 units. Few screens have a screen range beyond this measure.

The numerals 47, 48 and 49 identify series resistors which define the highlight optical density. Working with a positive image source, the highlight optical density is normally a low number as mentioned above. However, three decades are incorporated so that the apparatus will function with a negative. In a negative, the highlights will obviously be dark and hence, a larger number will be required. Accordingly, the numeral 47 identifies the resistor which represents units of optical density while the numeral 48 identifies the series resistor which represents tenths of optical density. The resistor 49 represents hundredths of optical density. The numerals 50, 51 and 52 identify movable taps adjustable on the series resistors 47, 48 and 49.

The numerals 53 and 54 identify series resistors which represent tenths and hundredths of excess optical density range. The taps 55 and 56 are movable to values of excess optical density. The tap 56 goes to ground.

The three resistors in series represent highlight optical density, screen range, and excess optical density as described.

The meter movement 36 is connected across opposing corners of the bridge. It is protected by a small series resistor 57 and protective diodes 58 and 59 prevent excessive current flow through the meter movement 36.

In the use of the bridge circuit described to this juncture, it will be observed that one leg incorporates one adjustable resistor while the other leg incorporates three resistors representing three values. The equation given above is solved through the use of the bridge circuit. In most practical situations, the screen range being used will remain constant and accordingly, the value of the screen range is set in the equipment and is normally left unchanged. The operator will normally be supplied with the values of the highlight and shadow tone optical densities. These numbers also are set in. This then leaves the excess optical density range to be calculated. The resistors 53 and 54 are representative of excess optical density and thus manipulated while the observing the meter movement 36. The meter movement 36 indicates the direction of adjustment required. As the values are adjusted, the meter movement approaches a null. When a null is achieved, the value of excess optical density has been calculated. In other circumstances, the excess optical density may be known while some other value is then unknown. The bridge circuit can be used to calculate one of the four values mentioned above.

Attention is next directed to lower portions of FIG. 1A. The numeral 61 identifies a series resistor connected to a similar series resistor 62. The resistor 61 is adjustable by means of a movable tap 63. The tap 63 is adjusted to points representing hundredths of excess optical density. The tap 63 is mechanically connected to the tap 56 in the bridge circuit and they move together. The series resistor 62 represents tenths of units of optical density. It incorporates a tap 64 which is mechanically ganged with the tap 55 in the bridge circuit. The adjustable tap 64 is then connected to a set of relay contacts at 65. More will be noted concerning the relay contacts hereinafter.

The numerals 67 and 68 identify adjustable series resistors which incorporate taps 69 and 70. The resistor 67 represents tenths of units while the resistor 68 represents hundredths of units. The taps 69 and 70 are mechanically ganged to the taps 51 and 52, respectively.

As will be understood from the interconnection of the adjustable taps, the first pair of resistors 61 and 62 serve as an input for the excess optical density. The other set of resistors 67 and 68 serve as the highlight input. They form voltage levels which represent these two variables. These voltage levels are input to the relay contacts 65. The levels selected by the relay contacts 65 are supplied to a switch 72 connected with a conductor 73. The conductor goes elsewhere for purposes to be described. The switch 72 is alternately grounded to the conductor 13.

Figure 1B:
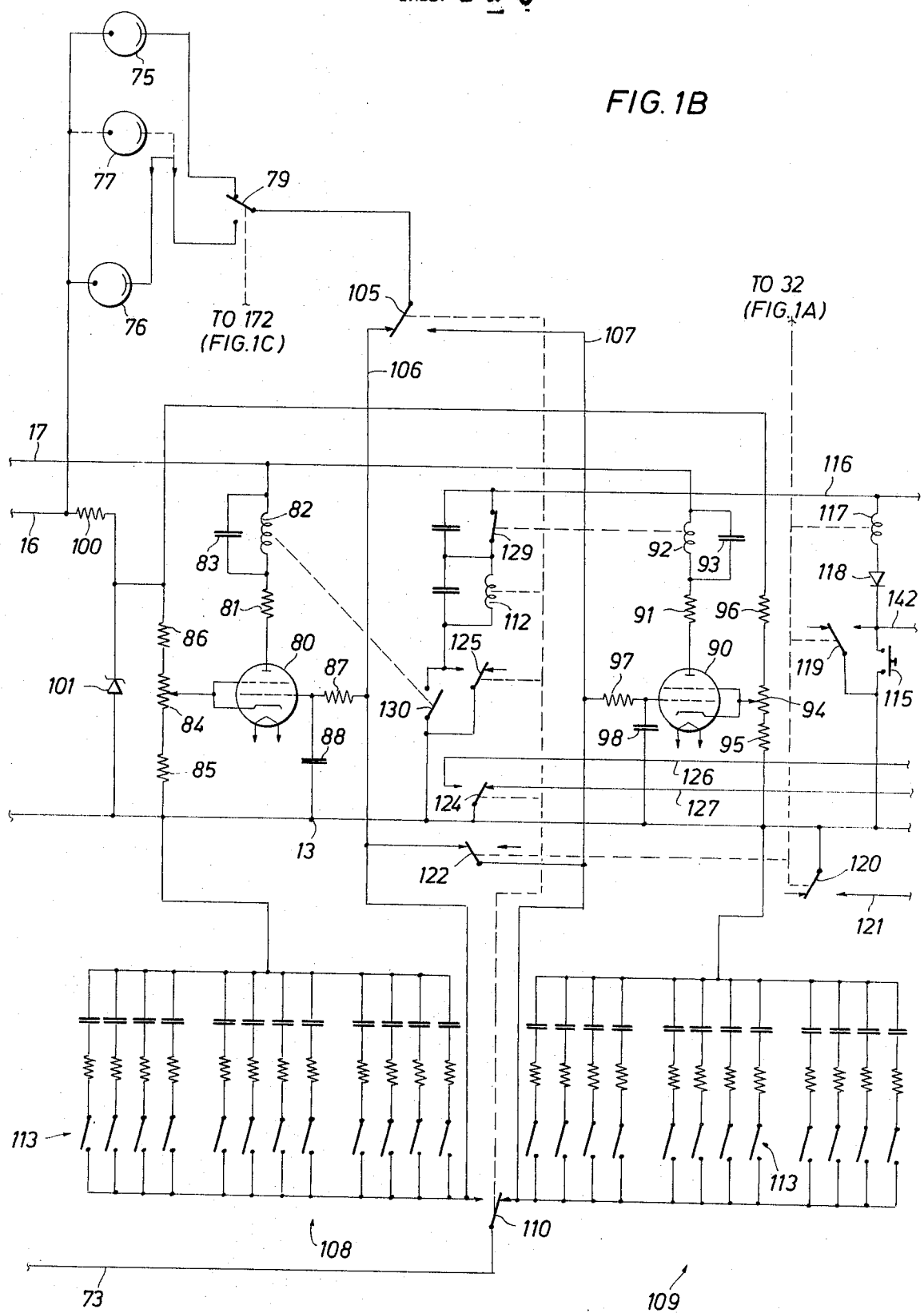

Attention is next directed to FIG. 1B of the drawings. In this view, the numeral 75 identifies the regular photocell. It is a photodiode in the preferred embodiment which monitors the light falling on the photographic medium to be exposed. Moreover, it is exposed to the light which falls on the medium in what will be termed the main exposure, to be contrasted with the flashing exposure. The numeral 76 identifies a flash photodiode which is responsive to the light from the lamp 35. It will be recalled that the lamp 35 is connected in parallel with the output socket 30. It is operated simultaneously with the flashing lamp source. It operates for the same interval. The lamp 35 in conjunction with the photodiode 76 from signals which will be of assistance in the timing of the operation of the flash exposure.

The numeral 77 identifies a photodiode which can be installed remote from the apparatus shown in the drawings. The photodiode 77 is preferably installed at the process camera and is illuminated by the lamps providing the flashing exposure. It can be used instead of the photodiode 76 which is inside the chassis of the present equipment and is exposed to the lamp 35.

The photodiodes 75, 76 and 77 are connected through a set of relay contacts indicated at 79. These relay contacts are ganged with the relay contacts 31 previously identified and are operated by a relay located elsewhere as will be stated.

FIG. 1B illustrates duplicate apparatus which is cyclically operated. Very broadly, FIG. 1B illustrates duplicate thyratron tubes and duplicate time unit input circuits. The duplicate systems are alternately operated to define one cycle of operation. In other words, each thyratron must be fired to define one cycle of operation. The process is repetitive so that many cycles of operation may occur. Going now to the specifics, the numeral 80 identifies a first thyratron while the numeral 90 identifies a similar thyratron. The thyratrons are both equipped with heaters and the appropriate suppressor grids. The thyratrons 80 and 90 have plate circuits which include series resistors 81 and 91, and relay armatures 82 and 92. The armatures are in parallel with capacitors 83 and 93. Both plate circuits connect the the conductor 17 which supplies an AC input, typically 110 volts, to the thyratrons.

The cathodes of both tubes are connected to a adjustable supply. Thus, the numerals 84 and 94 identify adjustable resistors. The resistors 84 and 94 are in series with the resistors 85 and 86, and 95 and 96, respectively. The control grids have series input resistors 87 and 97, respectively. Small grounding capacitors are connected to the control grids as indicated by the numerals 88 and 98. Input signals for the control grids are provided from circuitry to be described.

The cathodes are supplied with a voltage level which is adjustable as mentioned. The DC conductor 16 is input through a series dropping resistor 100. It is connected to a Zener diode 101. The Zener diode 101 obtains a regulated level which is supplied to both cathodes. This permits the cathodes to be adjusted to selected levels with respect to the grid voltages of the thyratrons, thereby adjusting the time of firing of the thyratrons.

The thyratrons are operated in a self-extinguishing manner. The plate circuits are connected to an AC supply. When the thyratrons fire, they conduct heavily when the plate is positive and the grid-cathode voltage is not too negative. They are self-extinguishing when the plate voltage goes negative. When the plate voltage goes negative, the conduction is terminated, notwithstanding the grid-cathode potential.

The circuitry to be described next is that portion of circuitry connected to the control grids of the two thyratrons 80 and 90. It will be observed that they are supplied with the same signals. However, they are supplied in parallel. Thus, the numeral 79 identifies relay contacts connecting the photodiodes to an additional set of relay contacts at 105. The relay contacts 105 connect to conductors 106 and 107. The conductors 106 is connected to the grid of the thyratron 80. In addition, the conductor 106 is connected to a plurality of capacitors generally indicated at 108. Similarly, the conductor 107 connects to the grid of the thyratron 90 and is also connected to a plurality of capacitors generally indicated at 109. The input conductor 73 which comes from the resistors shown in FIG. 1A is connected through a set of relay contacts at 110 and alternately charges the banks of capacitors at 108 and 109. The relay contacts 110 operate simultaneously with the relay contacts 105. Their armature is indicated by the numeral 112. More will be noted concerning its operation.

The relay contacts 105 and 110 are out of phase with one another. A discharge path through one of the photodiodes is selected by the relay contacts 79 and is applied to the conductors 106 or 107. If it is applied to the left-hand thyratron, the relay contacts 110 apply a charging voltage to the right-hand bank of capacitors 109. This is illustrated in FIG. 1B. When the relay 112 operates, the connections are reversed.

The present apparatus stores a negative charge on the capacitor banks 108 and 109. This capacitor charge is determined by the setting on the resistive networks 61 and 62 or 67 and 68 shown in FIG. 1A. This level is input on the conductor 73. In the illustrated position, the capacitor bank 109 is charged to the selected level. The charge is stored and held until the subsequent operation of the relay 112.

Viewing the thyratron 80, light falling on one of the photodiodes 75, 76 and 77 controls discharge for the capacitive bank 108. The rate of discharge is determined by the amount of light falling on the diode, the voltage level on the conductor 73 which charged the capacitor bank, and the value of capacitors switched into the bank. The rate of discharge is thus a function of these three variables.

Time units of exposure are supplied to the several capacitors at 108 and 109. Each bank preferably incorporates groups of four capacitors. The groups represent units, tens, and hundreds of arbitrary time units. They are arranged in BCD connection. Moreover, a small series resistor is connected to a series switch which implements the BCD encoding. The arbitrary time units are thus converted into a proportionate capacitance by summing the various capacitors in each bank. The switches are indicated at 112 and 113 and are operated in a manner to be described.

The numeral 115 identifies a start switch which is momentarily depressed. The start switch 115 is connected to a B plus supply which is interupted by a cancel switch as will be described. The switch 115 is thus connected to a voltage supply at 116. The conductor 116 is connected through a relay armature 117 which will be referred to as the start relay. Polarity of current flow through the relay 117 is determined by a diode 118. The numeral 119 identifies a set of contacts operated by the start relay 117 which locks across the switch 115, maintaining the electrical condition obtained on momentary depression of the switch 115. Of course, the switch 115 is connected to the ground 13.

The start relay 117 achieves many functions. For instance, the numeral 120 identifies relay contacts which provide a reset signal on a conductor 121 to be described. In addition, the numeral 122 identifies relay contacts operated by the start relay which tie the two grid circuits of the thyratrons together. This means that these two grid circuits start with the same voltage levels. The relay contacts 122 connect the capacitor banks 108 and 109 in parallel so that they achieve a common charge level.

The relay 112 will be denoted as the count relay. The count relay operates the relay contacts 105 and 110 previously mentioned. In addition, the count relay 112 operates the relay contacts 124 and 125. The relay contact 124 forms signals on the conductors 126 and 127. A ground signal is provided on these two conductors. The conductors 126 and 127 communicate with a counter mechanism to be described. The counter totals the number of operations of the count relay 112.

The conductor 116 provides power for the relay 112. Power for its operation is determined by closure of a relay contact 129 operated by the relay 92 in the thyratron complete circuit. The relay 82 in the plate circuitry of the other thyratron closes the relay contacts 130. The conductor 116 provides a DC level which is switched by the contacts 125, 129 and 130 to control flow through the count relay 112. In operation, when the thyratron 80 conducts, the relay contact 130 is closed allowing current flow through the count relay 112. The contacts 125 on the count relay 112 close and the count relay remains in the "turned on" condition. When the thyratron 90 fires, current flows through its plate circuit and opens the relay contacts 129. The current flow through the count relay 112 is thereby interrupted and the relay contacts return to the position shown. Capacitors connected across the contacts 129 and across the relay 112 momentarily store charges which discharge through the relay winding 112.

Figure 1C:
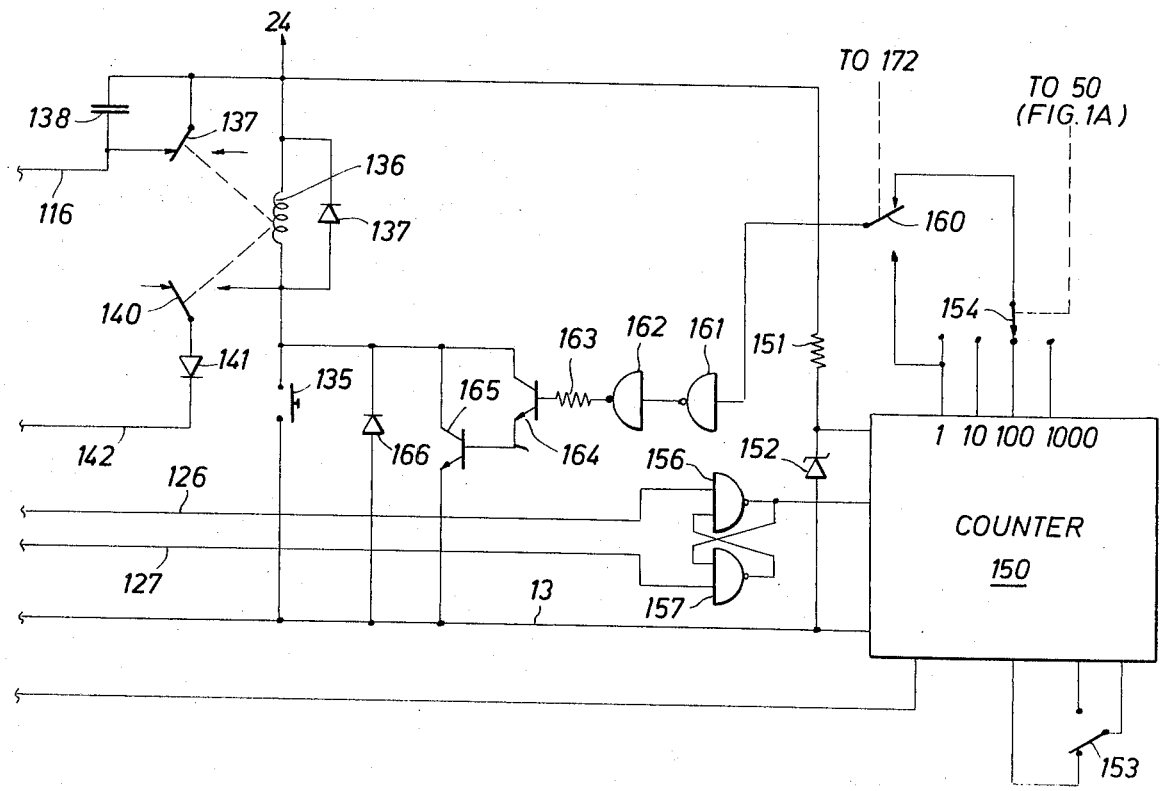
Figure 1C:
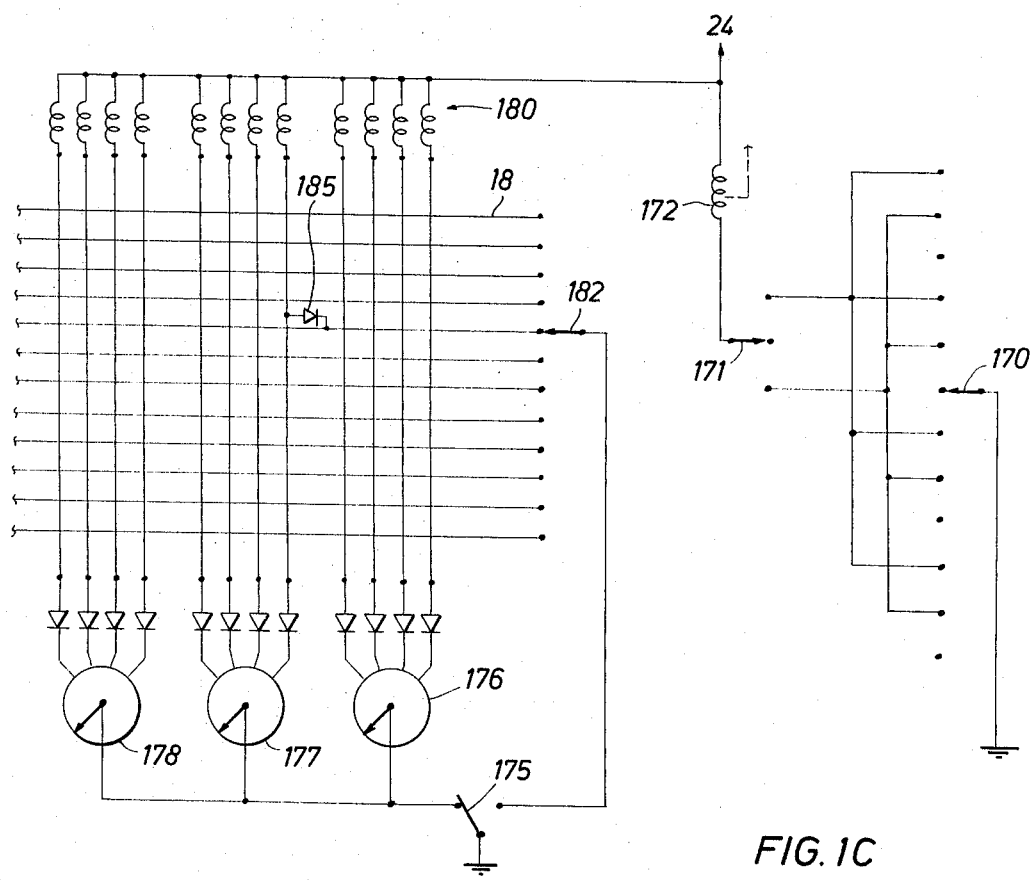

Attention is next directed to FIG. 1C of the drawings. In FIG. 1C, the conductor 116 provides the power for the operation of the start circuitry and the count relay. Power for this conductor is controlled by a cancel switch 135. The cancel switch 135 is momentarily depressed. This causes current to flow through a cancel relay 136. The relay is protected against reversed polarity by a diode 137. When the relay 136 is actuated, it opens a set of contacts at 137, terminating the bypass path through the contacts around a blocking capacitor 138. This terminates current flow through the conductor 116. In addition, the cancel relay 136 provides closure of a relay contact 140. The relay contact 140 is connected to a series diode 141. The diode 141 is connected to a conductor 142 which is returned to FIG. 1B. When the relay 136 is operated, the low side of the coil drops almost to ground potential. This provides a ground input to the anode of the diode 141. This, in effect, grounds the start switch 115. This defeats the start switch 115. The start relay 117 is deprived of current flow by the relay contacts 137.

From the foregoing, it will be understood how the cancel switch 135 overrides the operation of the thyratrons 80 and 90. When the cancel switch 135 is operated, the start relay 117 is deprived of power and is prevented from operating. This returns the relay contacts 122 to the illustrated position, tying the grids of the two thyratrons together and further, connecting the capacitors 108 and 109 in parallel.

The circuitry of FIG. 1C includes a means in parallel with the cancel switch 135 and providing an automatic cancel. The automatic cancel signals signifies the end of operation of the apparatus.

The numeral 150 identifies an integrated circuit counter which counts through several decades. It is provided with a ground connection to the conductor 13. A suitable B+ level is provided by means of a resistor 151 connected to a grounded Zener diode 152. This provides a regulated B+ for the counter 150. The counter 150 preferably comprises several decades so that it can count through perhaps three to five orders of magnitude. A scale switch is provided at 153 inserting or deleting a decade of counting capability at the front end and hence, altering the scale of the device if desired. Additionally, a switch 154 selects the number of decades that the counter 150 may cycle through. Preferably, it counts through the decades of one, 10, 100, and 1,000. Additional decades can be incorporated as desired. Moreover, the switch 154 is ganged to the switch 50 shown in FIG. 1A. The four illustrated terminals represent units of optical density and are respectively 0, 1, 2 and 3. This corresponds with the choices or positions of the switch 50.

The conductors 126 and 127 extend from the count relay 112. They are input to a pair of nor gates 156 and 157. The nor gates form a flip flop which inputs count pulses to the counter 150. The counter 150 counts to selected output levels which are one, 10, 100, or 1,000 as selected by the switch 154. Assume for purposes of illustration, that the switch 154 is on the one hundred output. The counter output counts 100 pulses and then forms a signal on the switch 154 which is then transferred to a set of relay contacts 160. The relay contacts 160 transfer the output signal through a pair of consecutive nor gates 161 and 162 which serve as an amplifier. The signal is then transferred through a series resistor 163 and then through a pair of transistors 164 and 165. The transistors amplify the current level of the signal. The transistor 165 serves as a switching transistor. When its base goes positive, it conducts heavily from collector to emitter thereby simulating closure of the cancel switch 135. The transistor 165 is protected from reverse polarity by a diode 166.

The signal on the transistor 165 simulates closure of the switch 135. This is achieved when the counter 150 has counted to the predetermined level. This is achieved to indicate that the thyratrons 80 and 90 have switched back and forth through a selected number of cycles to control the timed interval. Conduction of the transistor 165 terminates operation of all the apparatus, returning it to the illustrated or reset position. The counter 150 is reset by return of the relay contacts 120 to the illustrated position when the start relay 117 terminates conduction.

In FIG. 1C, the numeral 170 identifies a switch which cycles through selected positions to provide a ground path through a conductive network and a second switch 171. The switch 171 is in series with a relay 172 which will be termed the flash relay hereinafter. The relay 172 operates the relay contacts 31, 79, 160 and 65. Dependent on the settings, the flash relay 172 is deprived of a path to ground and hence is inoperative. When the relay 172 is inoperative, the four contacts mentioned above are in the illustrated position which is the density position. This is the position preparing the apparatus for exposure of an image source onto a sensitive medium. When the relay 172 has been operated by current flow through it, the four relay contacts mentioned above reverse their position to enable a flash exposure. Flash exposure is to be contrasted with the main exposure achieved in the other position. Recalling, a flash exposure is used to uniformly expose the photographic medium to overcome the chemical inertia of the medium prior to the main exposure. The relay 172 accomplishes selection between these two functions.

FIG. 1C additionally illustrates means for programming selected density values into the apparatus. The numeral 175 identifies a switch which chooses between programmed control and manual control. The program switch 175 connects with three decades of switch 176, 177, and 178. The switches are all BCD in operation. They provide selected paths to ground. The numeral 180 identifies a plurality of reed relays. The relays 180 operate the switches 113 shown in FIG. 1B. Consider the left-hand relay 180 illustrated in FIG. 1C. It is connected to the left-hand switch at 113 shown in FIG. 1B. Inasmuch as the capacitive banks 108 and 109 are duplicates, the single relay operates in both capacitive banks.

The switch 175 provides a choice between manual and programmed control. It is illustrated in a position to provide manual control. The switches 176, 177 and 178 are switched to encode BCD signals for three decades of arbitrary time units. When the switch is moved to the other position, it provides a path to ground for an additional switch 182. The switch 182 is moved to one of several programmed positions, twelve in the preferred embodiment. A ground connection is achieved whereby pins bearing shorting diodes are inserted to short between conductors 184 and the several relays 180. A shorting diode 185 is illustrated for descriptive purposes. The shorting diode 185 provides a path to ground to a bus 184 which is communicated to the switch 182. The switch 182 can thus cycle to various busses 184. In the illustrated position, a path to ground is defined through the shorting diode 185. This enables one relay 180 to operate resulting in two closures at the bank of diodes 108 and 109. This is a system whereby automatic programming of the arbitrary time units desired for a particular photographic item are implemented and used repetitively. Repetition is fairly common in work of this sort.

An example of operation should next be considered. Referring to the bridge circuit, assume for sake of discussion that a flashing exposure is to be achieved. In this event, the relay 172 is made operative. The relay 172 reverses the connection of relay contacts 160, 79, 65, and 31. The amount of flash required is determined through the use of the bridge circuit. The potentiometer is adjusted to the shadow tone density. The taps 45 and 46 are moved to the specified screen range optical density. The highlight optical density is supplied to the bridge circuit by adjusting the taps 51 and 52. The tap 50 is moved to the 0 point inasmuch as the highlight optical density is practically always less than 1.00 and is typically in the range of about 0.00 to about 0.3 or so. The taps 55 and 56 are moved until the excess optical density is determined. The bridge circuit balances when the proper excess density has been calculated. The excess density is supplied by the ganged taps to the movable taps 63 and 64. At this juncture, the necessary data has been input from the image and image copy to be formed. In addition, arbitrary time units are set into the capacitor bank 108 and 109. This is done by manipulation of the BCD encoding mechanisms shown at 176, 177 and 178, presuming manual input. Alternatively, program inputs can be obtained by reversing the switch 175 and moving the switch 182 to the selected bus. The selected bus is then connected with the various relays 180 by means of shorting diodes 185 to BCD encode the time units.

After the equipment is made ready, the start switch 115 is momentarily depressed. The thyratron 80 begins conduction. It conducts for an interval determined by the rate of discharge of the photodiodes 76 or 77. When the thyratron 80 fires, current flows through its plate relay 82 and reverses the condition of the relay 112 and initiates operation of the thyratron circuit 90. When the relay 112 operates, the capacitors at 109 are left floating, subject to discharge by operation of the photodiodes 76 or 77. The operation of the first thyratron forms one half of the count while the operation of the second thyratron forms the second half of the count. When the thyratron 90 senses discharge of the capacitors 109 and fires, a signal is formed in its plate circuit which reverses the condition of the relay 112. At this time, one full count has been formed and is transferred on the conductors 126 and 127 through the latching flip flop and into the counter 150. The counter 150 will eventually form an output signal indicative of a full count which is transferred through the relay contacts 160. A signal is applied through the voltage and current amplifying circuitry to place an essentially short circuit across the cancel switch 135. This electronic signal terminates operation. It terminates it by operating the relay 136 which removes the B plus voltage for the relays 112 and 117. At any point during the cycle, the switch 135 can be momentarily depressed to abort the entire operation and return everything to the initial quiescent condition.

A main exposure may involve even larger density numbers. One significant change resulting from the use of a larger density number is the positioning of the tap 50 at a point on the resistor 47 to correspond with an optical density of 1.00 or greater for the highlight. In this event, the switch 154 is moved to a different point on the counter output at 150. Thus, the counter may require multiple cycles even as many as 100 – 1,000. This may occur with arbitrary time units of substantial number input to the device. The time units serve as a scale factor accommodating variations in film speed, lens systems, and the like.

Many alterations and variations of the present invention may be incorporated, but the scope thereof is determined by the claims which are appended hereto.

I claim:

1. An apparatus for controlling the exposure of a photographic medium to accept an image source which has shadow tones and highlight density values which differ from one another through the use of a screen having a given screen range, comprising:
    computing means for receiving multiple inputs representative of at least two of three variables which are highlight density, shadow tone density, and screen range, said means determining the remaining of said variables from the two variables input thereto and relating an exposure time to the value of the variables; and,
    first means connected to said computing means for controlling the integral of light exposure of a photographic medium in response to the variables supplied thereto.

2. The apparatus of claim 1 wherein said computing means includes a resistive bridge circuit for relating the variables to one another and wherein said bridge circuit inicludes variable elements which are adjustable to cause said bridge circuit to seek a null condition when the three variables have been determined and said bridge circuit is operatively connected to an RC timing circuit to control its timed operation, and said first means includes a lamp control circuit adapted to be connected to an exposure lamp.

3. The apparatus of claim 2 wherein said computing means solves the equation $S = H + R$, where $S$ represents shadow tone density, $H$ represents highlight density and $R$ represents screen range, all defined for a positive image source.

4. The apparatus of claim 2 wherein said computing means has three inputs representative of four variables where the additional variable is excess density and said computing means determines the remaining of the four variables.

5. The apparatus of claim 4 wherein said computing means is a bridge circuit having one leg which is variable to represent one of the four variables, and having another leg which includes three variable components to represent the remaining three variables.

6. An apparatus for controlling the exposure of a photographic medium in a process camera apparatus which includes a light source turned on for an interval to expose a photographic medium in the camera, comprising:

light sensitive means exposed to light coterminous in duration to the exposure of a photographic medium in a process camera by a light source;

RC timing circuit means for storing a charge to a predetermined level;

a discharge path in said RC timing circuit means, said discharge path incorporating said light sensitive means in a manner such that the rate of discharge of said RC timing circuit means is determined at least in part by said light sensitive means;

means connected to said RC timing circuit means for determining discharge thereof to a predetermined level, said means forming an output signal so indicating; and, means responsive to the output signal for terminating operation of a light source in the process camera.

7. The apparatus of claim 6 wherein said RC timing circuit means is discharged at least twice and wherein said last named means requires at least two of the output signals to exercise control over the light source.

8. The apparatus of claim 6 wherein said RC timing circuit means is duplicated and said duplicate circuits are operated alternately.

9. The apparatus of claim 8 wherein said duplicate RC circuit means are alternately charged and discharged.

10. The apparatus of claim 8 including a digital counter means which stores the output signals which are provided thereto in the form of pulses.

11. An apparatus for controlling the exposure of a photographic medium to accept a photographic image from an image source which comprises:

a light responsive means constructed and arranged to receive light which falls on such a photographic medium;

a pair of adjustable capacitive networks adapted to receive and hold a charge thereon from a charging source; and, resistive circuit means connected to said light responsive means and to said pair of capacitive networks for at least partially discharging first one of said pair and thereafter the other of said pair which discharge represents the light falling on the photographic medium.

12. The apparatus of claim 11 including means for charging one of said pair and then the other of said pair.

13. The apparatus of claim 11 including a counter means for counting repetition of discharging of said pair of capacitive networks.

14. The apparatus of claim 13 including a switch means for controlling discharge of said pair, and wherein said switch means is connected to said counter means.

15. The apparatus of claim 11 including a switch means connected to said pair of capacitive networks for selectively and controllably altering the capacitive value of said capacitive networks.

16. An apparatus for controlling the exposure of a photographic medium to accept a photographic image from an image source which comprises:

a light responsive means constructed and arranged to receive light which falls on such a photographic medium;

a pair of adjustable capacitive networks adapted to receive and hold a charge thereon from a charging source;

means for first connecting one of said pair and thereafter the other of said pair to said light responsive means, and wherein said pair are adapted to be adjusted to differing capacitive values representing differing assigned values of time units of exposure; and, means operatively connected to said capacitive networks for controlling the time integral of light falling on a photographic medium.

* * * * *